(12) United States Patent
Niehoff (10) Patent No.: US 11,322,926 B2
(45) Date of Patent: May 3, 2022

(54) HYBRID DC CIRCUIT BREAKER

(71) Applicant: Eaton Intelligent Power Limited, Dublin (IE)

(72) Inventor: Ronaldus Niehoff, Oldenzaal (NL)

(73) Assignee: Eaton Intelligent Power Limited, Dublin (IE)

( * ) Notice: Subject to any disclaimer, the term of this patent is extended or adjusted under 35 U.S.C. 154(b) by 419 days.

(21) Appl. No.: 16/311,699

(22) PCT Filed: Jun. 16, 2017

(86) PCT No.: PCT/EP2017/064797
§ 371 (c)(1),
(2) Date: Dec. 20, 2018

(87) PCT Pub. No.: WO2017/220443
PCT Pub. Date: Dec. 28, 2017

(65) Prior Publication Data
US 2019/0334340 A1 Oct. 31, 2019

(30) Foreign Application Priority Data
Jun. 22, 2016 (GB) .................................. 1610901

(51) Int. Cl.
*H02H 3/087* (2006.01)
*H01H 9/54* (2006.01)
(Continued)

(52) U.S. Cl.
CPC ............ *H02H 3/087* (2013.01); *H01H 9/541* (2013.01); *H01H 71/12* (2013.01); *H02H 7/261* (2013.01); *H02H 7/268* (2013.01)

(58) Field of Classification Search
CPC ........ H02H 3/087; H02H 7/261; H02H 7/268; H01H 9/541; H01H 71/12
See application file for complete search history.

(56) References Cited

U.S. PATENT DOCUMENTS

2008/0309402 A1* 12/2008 Ozimek ............ H01J 37/32174
327/593
2010/0007999 A1* 1/2010 Iwata .................. H02M 3/1588
361/18
(Continued)

FOREIGN PATENT DOCUMENTS

CN 105609344 A 5/2016
EP 0945983 A2 9/1999
(Continued)

*Primary Examiner* — Jue Zhang
(74) *Attorney, Agent, or Firm* — Leydig, Voit & Mayer, Ltd.

(57) ABSTRACT

A direct current circuit breaker includes: a positive supply line between a positive input terminal and a positive output terminal; a negative supply line between a negative input terminal and a negative output terminal connecting a direct current load to a supply; a series connection of a first galvanic separation switch and a bypass switch in the positive supply line, and a second galvanic separation switch in the negative supply line; a semiconductor switch element connected parallel to the bypass switch; and a series connected inductor in the positive supply line. The first and second galvanic separation switch, the bypass switch, and the semiconductor switch element are controlled using a processing unit.

20 Claims, 8 Drawing Sheets

(51) Int. Cl.
*H01H 71/12* (2006.01)
*H02H 7/26* (2006.01)

(56) References Cited

U.S. PATENT DOCUMENTS

| | | | |
|---|---|---|---|
| 2010/0019578 A1* | 1/2010 | Schreiber | H02M 3/158 307/82 |
| 2010/0202176 A1* | 8/2010 | Hallak | H02M 7/48 363/131 |
| 2013/0154487 A1* | 6/2013 | Kuang | H05B 45/3725 315/171 |
| 2014/0111005 A1* | 4/2014 | Liu | H02J 9/04 307/20 |
| 2015/0085409 A1* | 3/2015 | Ali | H01L 27/0285 361/56 |
| 2015/0214732 A1* | 7/2015 | Haruki | H02H 9/042 361/56 |
| 2015/0303803 A1* | 10/2015 | Chen | H02M 3/158 323/271 |
| 2016/0268898 A1* | 9/2016 | Deboy | H02M 3/158 |
| 2016/0276823 A1* | 9/2016 | Himeno | H02J 7/1423 |
| 2017/0085191 A1* | 3/2017 | Pastore | H02M 3/1582 |
| 2017/0257031 A1* | 9/2017 | Shao | H02M 3/1582 |

FOREIGN PATENT DOCUMENTS

| | | | |
|---|---|---|---|
| EP | 2320535 | A1 | 5/2011 |
| EP | 2410551 | A2 | 1/2012 |
| EP | 2469552 | A2 | 6/2012 |
| GB | 2527534 | A | 12/2015 |
| WO | WO 2011057675 | A1 | 5/2011 |
| WO | WO 2015028634 | A1 | 3/2015 |

\* cited by examiner

HYBRID DC CIRCUIT BREAKER

CROSS-REFERENCE TO PRIOR APPLICATIONS

This application is a U.S. National Phase application under 35 U.S.C. § 371 of International Application No. PCT/EP2017/064797, filed on Jun. 16, 2017, and claims benefit to British Patent Application No. GB 1610901.9, filed on Jun. 22, 2016. The International Application was published in English on Dec. 28, 2017 as WO 2017/220443 under PCT Article 21(2).

FIELD

The present invention relates to a direct current circuit breaker providing a number of operational and safety related functionalities, such as overcurrent protection.

BACKGROUND

International patent publication WO2015/028634 discloses an alternating current circuit breaker with a first galvanic separation switch and a bypass switch in a live line, and a second galvanic separation switch in a neutral line. A semiconductor switch element is connected parallel to the bypass switch. The semiconductor switch element comprises a combination of a rectifier bridge and an isolated gate bipolar transistor. A processing unit is connected to a current measurement unit arranged in the live line, and is arranged to control the bypass switch, first and second galvanic separation switches and the conducting state of the isolated gate bipolar transistor in case of detection of a short circuit condition.

European patent publication EP-A-2 320 535 discloses a current limiting circuit breaker including a short circuit functionality, which recloses after a set period of time after a first short circuit detection. If the short circuit fault is then again detected, a control unit is used to open the electrical circuit using a disconnector. A method for limiting current circulating in an electric circuit between an incoming line of an upstream circuit breaker and an outgoing line equipped with a downstream circuit breaker and/or divisional contactor is also disclosed.

International patent publication WO2011/057675 discloses a device to break an electrical current flowing through a power transmission or distribution line, specifically for high voltage DC applications. A parallel connection of a main breaker and a non-linear resistor is disclosed, the main breaker comprising at least one power semiconductor switch of a first current direction. Furthermore, a high speed switch in series with an auxiliary breaker is connected in parallel to the main breaker. First the auxiliary breaker is opened, thereby commutating the current to the main breaker, afterwards the high speed switch is safely opened. Then the main breaker is opened thereby commutating the current to the non-linear resistor.

SUMMARY

In an embodiment, the present invention provides a direct current circuit breaker, comprising: a positive supply line between a positive input terminal and a positive output terminal; a negative supply line between a negative input terminal and a negative output terminal connecting a direct current load to a supply; a series connection of a first galvanic separation switch and a bypass switch in the positive supply line, and a second galvanic separation switch in the negative supply line; a semiconductor switch element connected parallel to the bypass switch; and a series connected inductor in the positive supply line, wherein the first and second galvanic separation switch, the bypass switch, and the semiconductor switch element are controlled using a processing unit.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

The present invention will be discussed in more detail below, with reference to the attached drawings, in which.

DETAILED DESCRIPTION

An aspect of the present invention provides a circuit breaker which is optimized for direct current applications and able to operate in the higher current DC region, i.e. for more than about 10 A.

According to the present invention, a direct current circuit breaker is provided comprising a positive supply line between a positive input terminal and a positive output terminal, and a negative supply line between a negative input terminal and a negative output terminal for connecting a direct current load to a supply, a series connection of a first galvanic separation switch and a bypass switch in the positive supply line, and a second galvanic separation switch in the negative supply line, and a semiconductor switch element connected parallel to the bypass switch, wherein the first and second galvanic separation switch, the bypass switch and the semiconductor switch element are controlled using a processing unit, the direct current circuit breaker further comprising a series connected inductor in the positive supply line.

For direct current grids there is on many locations no or limited high short circuit energy available. The series connected inductor is dimensioned in such a way that it limits the change of current over time, dI/dt, resulting in sufficient time for the hybrid direct current circuit breaker to disconnect reliable at a short circuit direct at the output of the hybrid direct current circuit breaker.

In one group of further embodiments, a primary circuit is formed by the positive supply line and the negative supply line, and the direct current circuit breaker further comprises at least one secondary circuit connected to a secondary positive output terminal and to a secondary negative output terminal, the at least one secondary circuit being a duplicate of the primary circuit. In a further group of embodiments, at least one additional bypass switch is connected in parallel to the bypass switch. In both groups of embodiments, the direct current circuit breaker is optimized for DC applications, by having paralleled modules for splitting the load current into a number of smaller currents. This provides for a redundant design, as well as the possibility to use bypass switches (and possibly also galvanic separation switches) with a lower required current switching capacity. Such a modular design thus makes it possible to produce a cost-effective, efficient and compact solution for lower and higher power direct current applications.

The embodiments of the hybrid direct current (DC) circuit breaker as described herein can be applied in the fast upcoming DC-grids, which are more and more used as an alternative to AC grids. For small voltages and small currents up to about 10 A there are already a lot of full silicon solid state relays available where the on-state losses are not significant. For higher voltages or currents however the availability of silicon components which have low ohmic losses and at the same time a capability to switch high voltage and high currents is very limited. For this field of applications, the present hybrid circuit breaker is a perfect alternative.

The DC circuit breaker according to the present invention embodiments can be used for cable and device protection on distribution grid level or on final circuit level. As the embodiments described herein have a processing unit 5 (see description below), various capabilities which are advantageous to serve active DC-grids can be provided, such as, but not limited to remote monitoring, remote parameterization, event depending parameterization, remote control, communication/logging, protection for overcurrent, short circuit, over-temperature, fault current, and arc-fault, energy measurement, programmable selectivity, fail safe and redundant design.

The presently known DC-circuit breakers are mostly based on conventional mechanical switches with poles connected in series for higher grid voltages. Also the switching contacts are often de-rated for DC-use (compared with the same performance of the breaker in AC-use), as conventional mechanical switches have a lot of arcing at breaking DC voltages.

DC is by nature difficult to switch by contacts, a silicon switch solution (solid state switch) could be a good solution. However once in the on-state, a silicon component has losses, the 'on state losses'. For low currents or low voltages there are already silicon components with acceptable on state losses, but for higher currents the dissipations would still be unacceptable for many applications. To have the advantages of both of the types of switches a hybrid DC circuit breaker according to the present invention embodiment is provided.

Figure 1:
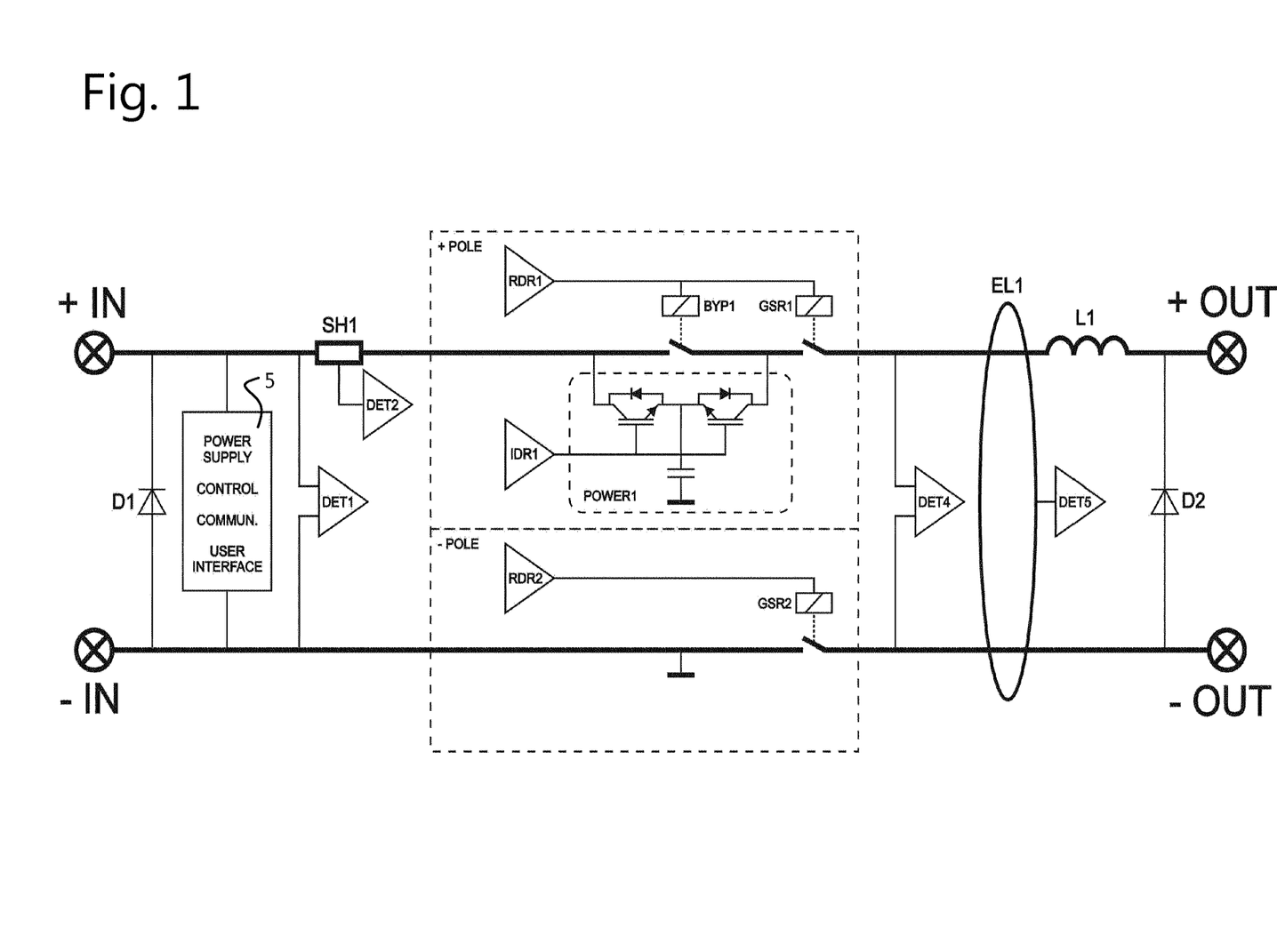
FIG. 1 shows a schematic diagram of a first embodiment of the hybrid DC circuit breaker according to the present invention.

This is shown in the schematic diagram of FIG. 1, which shows the basic architecture of the hybrid DC circuit breaker according to the present invention.

In the embodiment of FIG. 1, a direct current circuit breaker is provided comprising a positive supply line between a positive input terminal +IN and a positive output terminal +OUT, and a negative supply line between a negative input terminal −IN and a negative output terminal −OUT, for connecting a direct current load to a supply. A series connection of a first galvanic separation switch GSR1 and a bypass switch BYP1 is present in the positive supply line, and a second galvanic separation switch GSR2 in the negative supply line. A semiconductor switch element POWER1 is connected parallel to the bypass switch BYP1. The hybrid switch part is shown in the dashed line block with designation '+POLE', and comprises the first galvanic separation switch GSR1, the bypass switch BYP1 and semiconductor switch element POWER1.

The first and second galvanic separation switch GSR1, GSR2, the bypass switch BYP1 and the semiconductor switch element POWER1 are controlled using a processing unit 5. The processing unit 5 is provided with various functional blocks, including but not limited to a power supply, control unit, communication unit and user interface, which allow to provide the functionalities of remote monitoring, remote parameterization, event depending parameterization, remote control, communication/logging, protection for overcurrent, short circuit, over-temperature, fault current, and arc-fault, energy measurement, programmable selectivity, fail safe and redundant design.

The processing unit 5 may thus comprise circuitry for general internal power supply for all sub-circuits, for control of all the switch drivers (shown as signals RDRx, IDRy in the embodiments of FIG. 1-5), for functional behaviour program (including protocols for redundancy, remote control, remote parameterization, self-testing etc.), for a user interface, for communication (RS485, RF, Modbus, LAN, Wi-Fi etc.), for master to sub-distribution, slave to upper main-distribution, and for collecting all data from the detection means (DETi) and processing the data. The processing unit 5 also executes software for the protection functions as e.g. overcurrent, short-circuit, earth-fault and arc-fault.

The detection circuits as used (reference signs used in the FIG. 1-5 embodiments) and which are connected to the processing unit 5 are:

DET1: input voltage detection; momentary voltage measurement used for energy measurement, detection of voltage dips or absence, arc fault signals, etc.

DET2: main shunt current detection; momentary current measurement used for energy measurement (source or sink), arc fault signals, total load current and direction, current protection functions etc.

DET3, DET6, DET7, DET8: pole shunt current detection; momentary current measurement used for energy measurement (source or sink), current sharing between poles, pole protecting functions etc.

DET4: output voltage detection; momentary voltage measurement used for reverse feeding protection at switching ON of the DC-breaker (black start), self-test functionality etc.

DET5: earth-leakage detection; momentary value of the DC-earth fault.

For further details on the processing unit, reference is made to the implementation of a similar processing unit as described for an AC circuit breaker in international patent application WO2015/028634 of the same applicant, which is included herein by reference.

Furthermore, in the present invention embodiments, the direct current circuit breaker comprises a series connected inductor L1 in the positive supply line, e.g. as indicated with one terminal connected to the positive output terminal +OUT.

The inductor L1 has a special purpose. For DC-grids there is on many locations no high short circuit energy available and also no high short circuit capability of the breaker is needed. E.g. in solar power applications or when used behind a DC converter, 5 kA would already be sufficient. Inductor L1 is dimensioned in such a way that it limits the change of current over time, dI/dt, resulting in sufficient time for the hybrid DC circuit breaker to disconnect reliable at a short circuit direct at the output of the hybrid DC circuit breaker. As an exemplary embodiment, if the total breaking time of the DC circuit breaker is e.g. rated at 500 µs and a maximum breaking current is rated at 1500 A, the required change of current over time dI/dt=3 A/µs. For a DC source voltage connected to the input terminals +IN, −IN of e.g. 770V this would result in a minimum inductance value of the inductor LI of 260 µH (U=L*dI/dt).

The −POLE (indicated by dashed line in the embodiment of FIG. 1, comprising the second galvanic separation switch GSR2) is not from itself protected for overcurrent and short circuit since this is not necessary in most DC grids. It is only galvanic separated by the galvanic separation switch GSR2 under control of a relay driver signal RDR2. If protection would be needed the same block as for the +POLE could be used for the −POLE. A further embodiment may thus be provided wherein the direct current circuit breaker further comprises a second bypass switch in a series connection with the second galvanic separation switch GSR2.

One of the functionalities of a DC circuit breaker is to provide an earth leakage protection. In the embodiments described herein, a DC earth leakage detection is based on e.g. core-balance measurement, with different possible detection principles, which are known as such to the person skilled in the art, e.g. using a hall-element, a core hysteresis saturation etc. In the embodiments as shown in FIGS. 1 to 5, this is indicated by an earth leakage measurement arrangement ELI providing an earth leakage detection signal DET to the processing unit 5, and being arranged to monitor the positive supply line and negative supply line.

Over current, short circuit, load current, current direction etc. can be measured by a low-ohmic shunt SHI, providing a current detection signal DET2 for the processing unit 5. In generic wording, a first current measurement arrangement is provided, which is connected to the processing unit 5 for measuring current flowing from the positive input terminal +IN to the positive supply line. Furthermore, a first voltage measurement arrangement DET1 may be present which is connected to the processing unit 5 and arranged to measure a voltage between the positive input terminal +IN and the negative input terminal −IN. A second voltage measurement arrangement DET4 may be furthermore present for measuring voltage between the positive output terminal +OUT and the negative output terminal −OUT.

In the embodiment shown in FIG. 1, diodes D1 and D2 are added as indicated in the Figures directly connected between the input terminals +IN, −IN, and output terminals +OUT, −OUT, respectively. These are provided to avoid overvoltages on the inputs and outputs at switching off of the DC circuit breaker. In case the DC circuit breaker switches off, the energy in the wire-inductance will cause a peak voltage. The diodes D1 and D2 function as freewheel diode and will limit the overvoltage, depending on the direction of the current (energy from input to output or reverse). Thus, in one further embodiment, the direct current circuit breaker further comprises a first diode D1 having a cathode connected to the positive input terminal +IN and an anode connected to the negative input terminal −IN. In an even further embodiment, the direct current circuit breaker further comprises a second diode D2 having a cathode connected to the positive output terminal +OUT and an anode connected to the negative output terminal −OUT.

Figure 7:
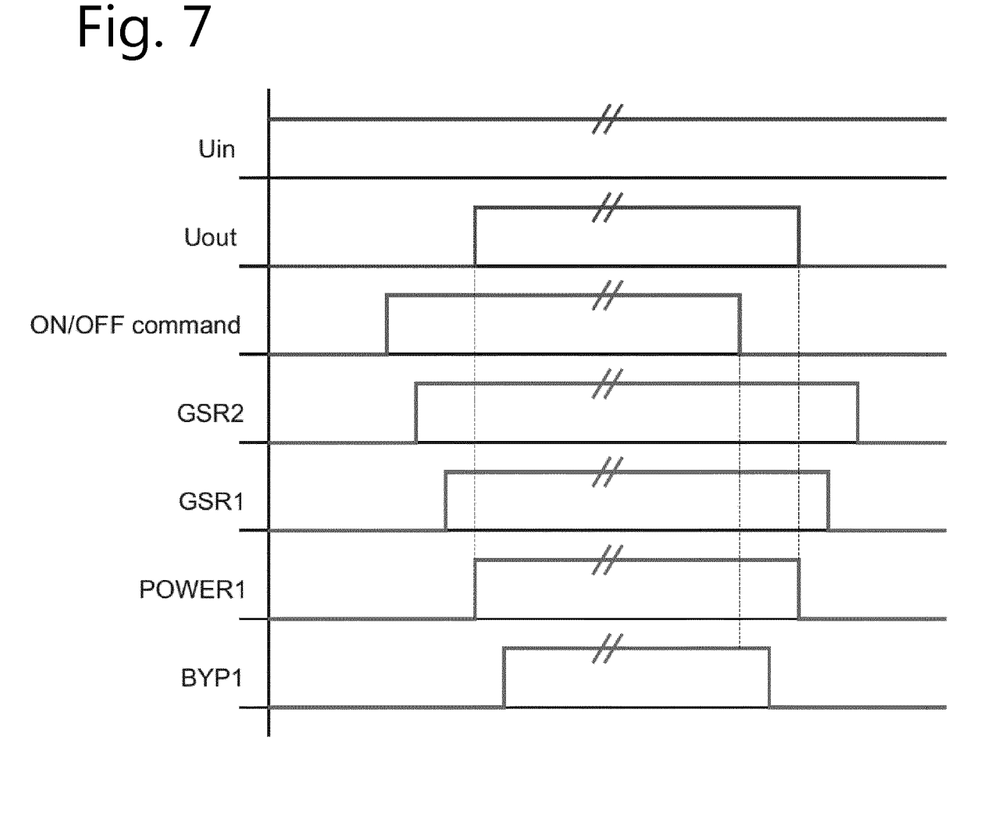
FIG. 7 shows a timing diagram of actuation of the various elements in the hybrid DC circuit breaker according to the present invention embodiments.

FIG. 7 shows a timing diagram of actuation of the various elements in the hybrid DC circuit breaker according to the present invention embodiments (with the horizontal axis being the time axis), and will be used here to explain the operational use of the DC circuit breaker embodiment of FIG. 1. It is assumed that an input DC voltage Uin is present at the input terminals +IN, −IN, as indicated in the top line of the timing diagram of FIG. 7, which on the second line shows the output voltage Uout on the output terminals +OUT, −OUT. After the ON command is given (third line, signal going 'high'), first the second galvanic separation switch GSR2 in the −POLE will close (fourth line). At the same time or a short while later the first galvanic separation switch GSR1 in the +POLE will close (fifth line). The ON switching itself is then done by the semiconductor switch element POWER1 (sixth line) which is in the load current forward direction and a short while later this is bypassed by the bypass switch BYP1 (seventh line). In the ON state it can be an advantage to switch off the semiconductor switch element POWER1.

After an OFF command the sequence is just the other way around, as also indicated in the timing diagram of FIG. 7. First the bypass switch BYP1 is opened. The semiconductor switch element POWER1 will execute the OFF switching after the bypass switch BYP1 has sufficient contact distance. As last actions the first and second galvanic separation switches GSR1 and GSR2 open to galvanic isolate the line+IN, −IN from the load side+OUT, −OUT. Please note that this sequence can be equal for both sourcing and sinking loads connected to the output terminals +OUT, −OUT.

All galvanic separation switches GSRm and bypass switches BYPn as described in relation to the present invention embodiments (FIG. 1-5) are bi-stable and are driven by a short current pulse (e.g. using a relay driver signal RDR1 in the FIG. 1 embodiment). Energizing is done by connecting a charged capacitor from a relay driver circuits. The galvanic separation switches GSRm have a large contact distance for reliable isolation and may be slow, the bypass switches BYPn only have a small contact distance, but are very fast at opening. In a further embodiment, all bypass switches BYPn have an opening time which is shorter than an opening time of any one of the galvanic separation switches GSRm.

A further problem which may occur in implementing DC circuit breakers is also that no small, ultra-fast, low-energizing, bi-stable relays are available on the market for the higher current range. If solutions for higher currents which are ultra-fast are made, these need a lot of energy for actuation. This makes a compact and economical design of a DC circuit breaker difficult. According to a further group of embodiment of the present invention, this problem is solved by splitting the high load current into paralleled modules. This way it is possible to use the available small bi-stable relays. Splitting the high load current into paralleled modules has also the advantage that redundancy and self-testing functionality is realized.

Figure 2:
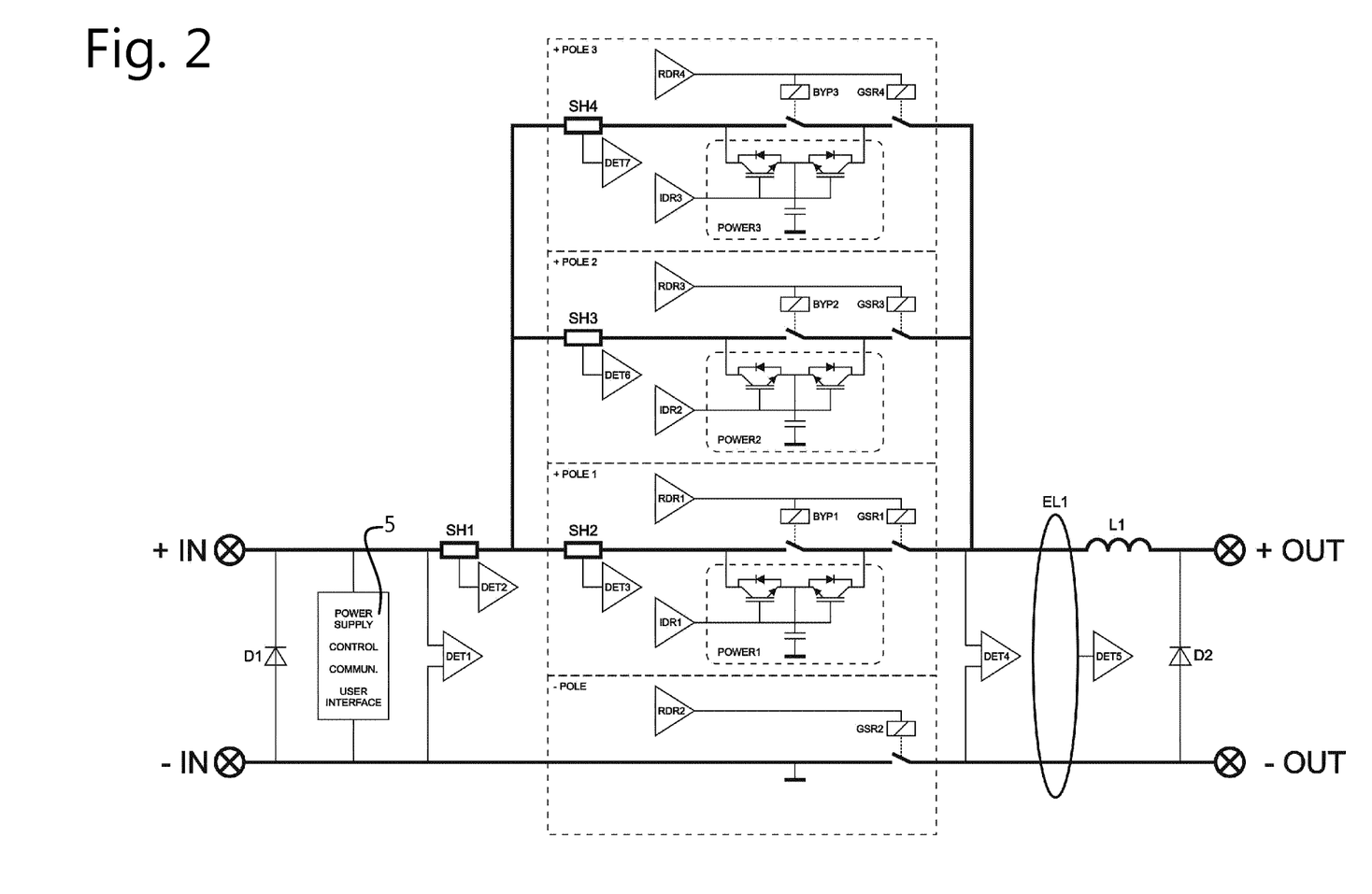
FIG. 2 shows a schematic diagram of a second embodiment of the hybrid DC circuit breaker according to the present invention.

FIG. 2 shows the architecture of an embodiment of the present invention hybrid DC circuit breaker for higher load currents and with redundancy. If one pole (+POLE in embodiment of FIG. 1) is not able to carry all the needed load current, a second pole (or third or more) can be paralleled, as shown in the embodiment of FIG. 2 by using +POLE1, +POLE2, +POLE3. Of course the current distribution between poles is relevant, but this can be controlled by properly selecting the internal wiring and contact materials. Also the shunt resistance SH2, SH3, SH4 in every pole +POLE1, +POLE2, +POLE3 helps to get an acceptable current distribution through the poles.

In the embodiment shown in FIG. 2, the direct current circuit breaker thus further comprises an additional galvanic separation switch GSR3; GSR4 connected in series to each of the at least one additional bypass switch BYP2; BYP3.

The poles +POLEn can be switched simultaneously or independently by the processing unit 5, using the associated driver signal pairs RDRx; IDRy as shown in FIG. 2. In case of an overcurrent or short circuit current one pole +POLEn could be designed so that it's able to disconnect the overcurrent or short circuit at its own. In that case the timing behavior and current distribution between poles +POLEn is not critical. It is also possible to divide overcurrent and short circuit currents between more poles +POLEn. This makes a smaller design of the semiconductor switch element POWERn (IGBT power modules) possible. The current distribution between poles +POLEn at a short circuit is, after opening of the bypass switch BYPn, determined by the properties of the semiconductor switch element POWERn (specifically the IGBT's) in each of both other poles +POLEn.

The reason to use two or more poles +POLEn in parallel as shown in the embodiment of FIG. 2 instead of one pole with a higher current rating is that the bypass switches BYPn and galvanic separation switches GSRm are advantageously small, ultra-fast, low-energizing and bi-stable which makes an economical design possible.

Another advantage is also that an extra pole +POLEn can be added for redundancy. If one pole is able to carry e.g. 100 A load current and the maximum load current is 200 A, it is possible to disconnect one of the three poles +POLEn and change between poles +POLEn. If one pole +POLEn becomes defective in this situation it is possible to send a message to a maintenance engineer to replace the DC circuit breaker. It is also possible to control the temperature and ageing between the different poles +POLEn by regular changing from pole to another pole or connecting three poles in parallel. Self-testing of a redundant pole +POLEf7 is also very easy: the semiconductor switch element POWERn, bypass switch BYPn and galvanic separation switch GSRm of one pole +POLEn can be switched ON and OFF without interruption of the load current.

To properly control this direct current circuit breaker embodiment in this manner, the direct current circuit breaker in a further embodiment comprises a bypass current measurement arrangement for each of an associated bypass switch (BYPn). This can be implemented as shown in the embodiment of FIG. 2 using a (low-ohmic) shunt resistance SH2, SH3, SH4 and associated detector signal DET3, DET6, DET7 to the processing unit 5.

Figure 3:
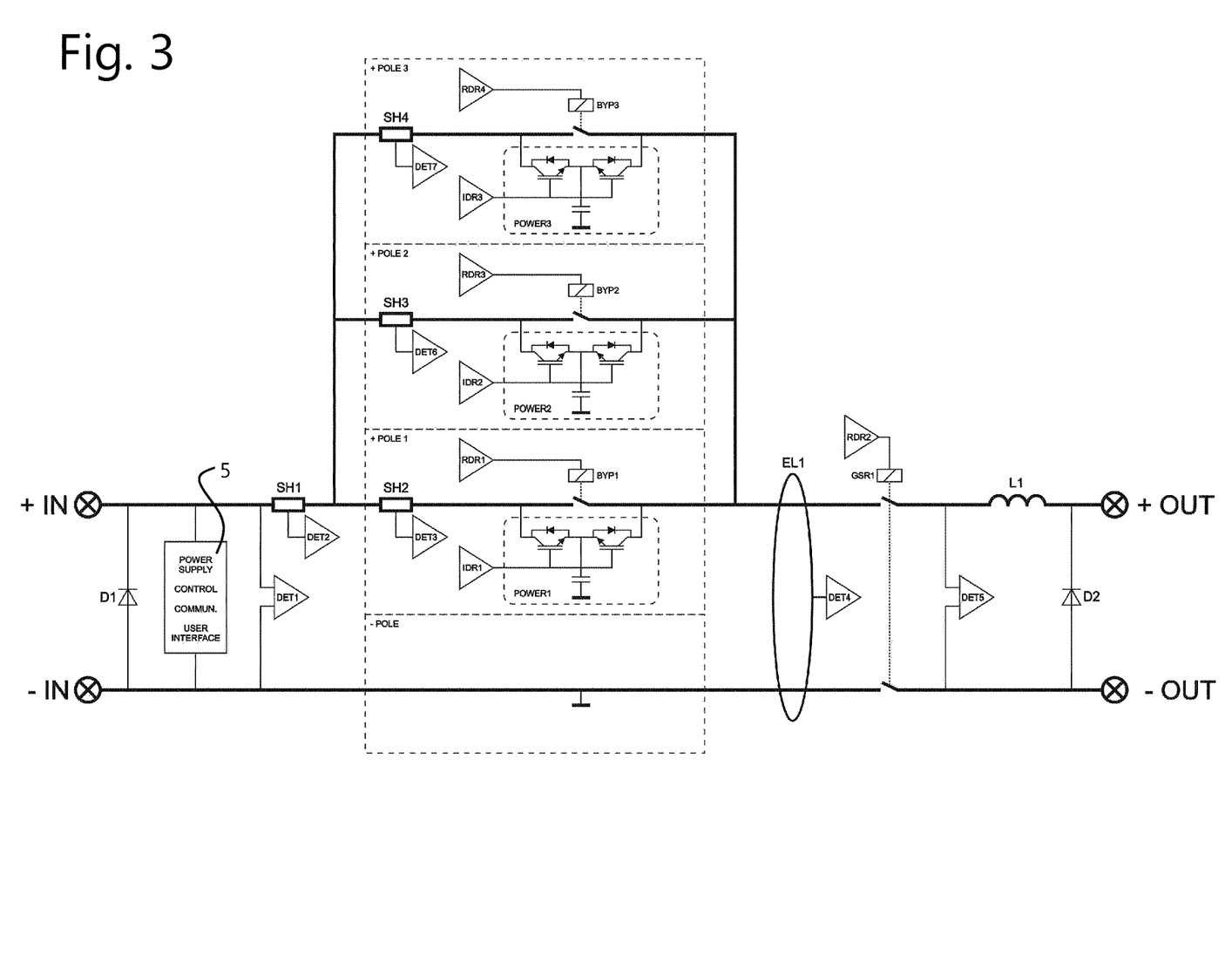
FIG. 3 shows a schematic diagram of a third embodiment of the hybrid DC circuit breaker according to the present invention.

The embodiment as shown in the schematic diagram of FIG. 3 has the same architecture as the embodiment shown in FIG. 2, with an exception of the galvanic separation switches GSRm. The two or more galvanic separation switches GSRm from the different poles +POLEn are now combined in one galvanic separation switch GSR1 on the output line. As shown, also the second galvanic separation switch GSR2 in the negative supply line can be combined in the same one galvanic separation switch GSR1. In this embodiment, wherein the first galvanic separation switch GSR1 and second galvanic separation switch GSR2 are combined and operated using a single relay driver signal RDR2 from the processing unit 5.

The advantage is that it is cheaper to have one galvanic separation switch GSR1 and one relay driver signal RDR2 instead of four. A disadvantage may be that the redundancy from the FIG. 2 embodiment is no longer applicable for the galvanic separation switch GSR1. On the other hand, galvanic separation is in general only needed for maintenance situations, for normal protection and switching the hybrid direct current circuit breaker embodiments with a single galvanic separation switch GSR1 are in many applications acceptable.

Another disadvantage may be that the galvanic separation switch GSR1 cannot be self-tested anymore. The combined galvanic separation switch GSR1 is too slow to shortly disconnect the load for a self-test. This could partly be solved by implementing a constant energized mono-stable relay as the combined galvanic separation switch GSR1 so that a more fail-safe implementation is provided than when using bi-stable relays, although it is noted that constant energized mono-stable relays have the disadvantage of the constant power consumption.

The direct current circuit breaker may in further embodiments further comprise an additional semiconductor switch element POWER2; POWER3 connected in parallel to each of the at least one additional bypass switch BYP2; BYP3, as shown in the embodiments of FIG. 2 and FIG. 3. This allows applying the use of the switching timing described above with reference to FIG. 7 in each and every one of the poles +POLEn.

Figure 4:
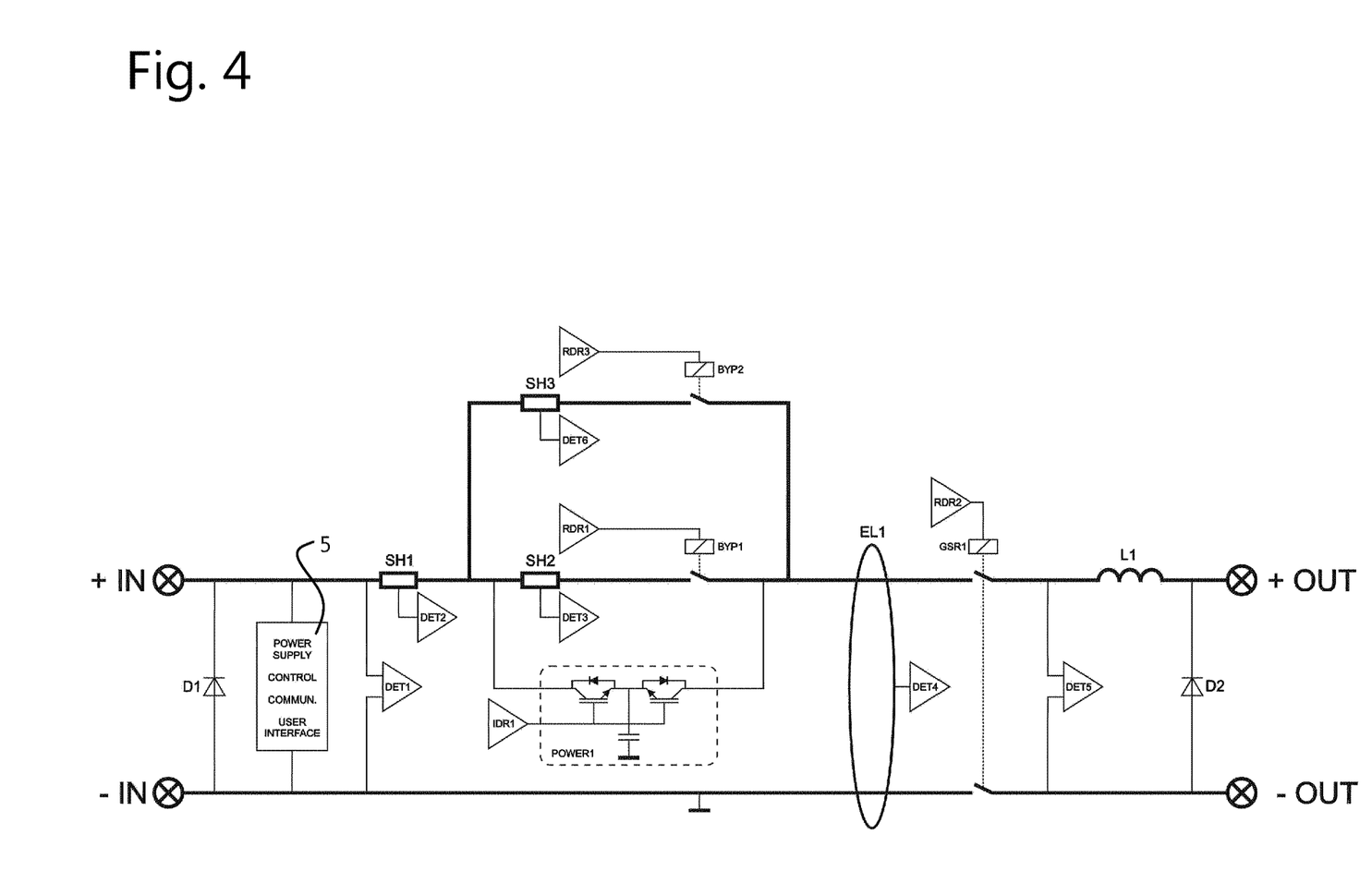
FIG. 4 shows a schematic diagram of a fourth embodiment of the hybrid DC circuit breaker according to the present invention.

The embodiment as shown in FIG. 4 provides an extra step in the reduction of components as compared to the embodiment shown in FIG. 3. Now not only the galvanic separation switches are combined in a single galvanic separation switch GSR1, but also the semiconductor switch elements POWERn are combined in a single version thereof (POWER1). Note that the semiconductor switch element POWER1 now is connected in parallel to the series connection of each bypass switch BYP1, BYP2 and associated shunt resistor SH2, SH3 (in the FIG. 3 embodiment, each semiconductor switch element POWERn is connected in parallel to the associated bypass switch BYPn only). This embodiment can be described in a more generic embodiment as a direct current circuit breaker further comprising at least one additional bypass switch BYP2; BYP3 connected in parallel to the bypass switch BYP1, which feature is present in the embodiment of FIG. 4, but also in the embodiments of FIG. 2 and FIG. 3.

In all embodiments semiconductor switch element POWERn normally is used for switching ON/OFF, so from an energy dissipation point of view it is possible to provide a single, combined semiconductor switch element POWER1. Also the short circuit disconnection is possible with a single semiconductor switch element POWER1, see also the description of the embodiment of FIG. 2. A main advantage is that the embodiment according to FIG. 4 is more economic to implement than the embodiment according to FIG. 3 (or 2). A proper current distribution is still possible by choosing the right contact wiring and contact material. The shunt resistor SH2, SH3 is also allowing to have a proper current distribution. As in the FIGS. 2 and 3 embodiment, also a variant of the FIG. 4 embodiment is possible with three or even more parallel current paths +POLEn. A possible disadvantage of this embodiment is that there is no redundancy in the semiconductor switch element POWERn (and the galvanic separation switches GSRn anymore, however, for applications where one single bypass switch BYP1 is not sufficient to carry the load current this embodiment provides an economical direct current circuit breaker.

Figure 5:
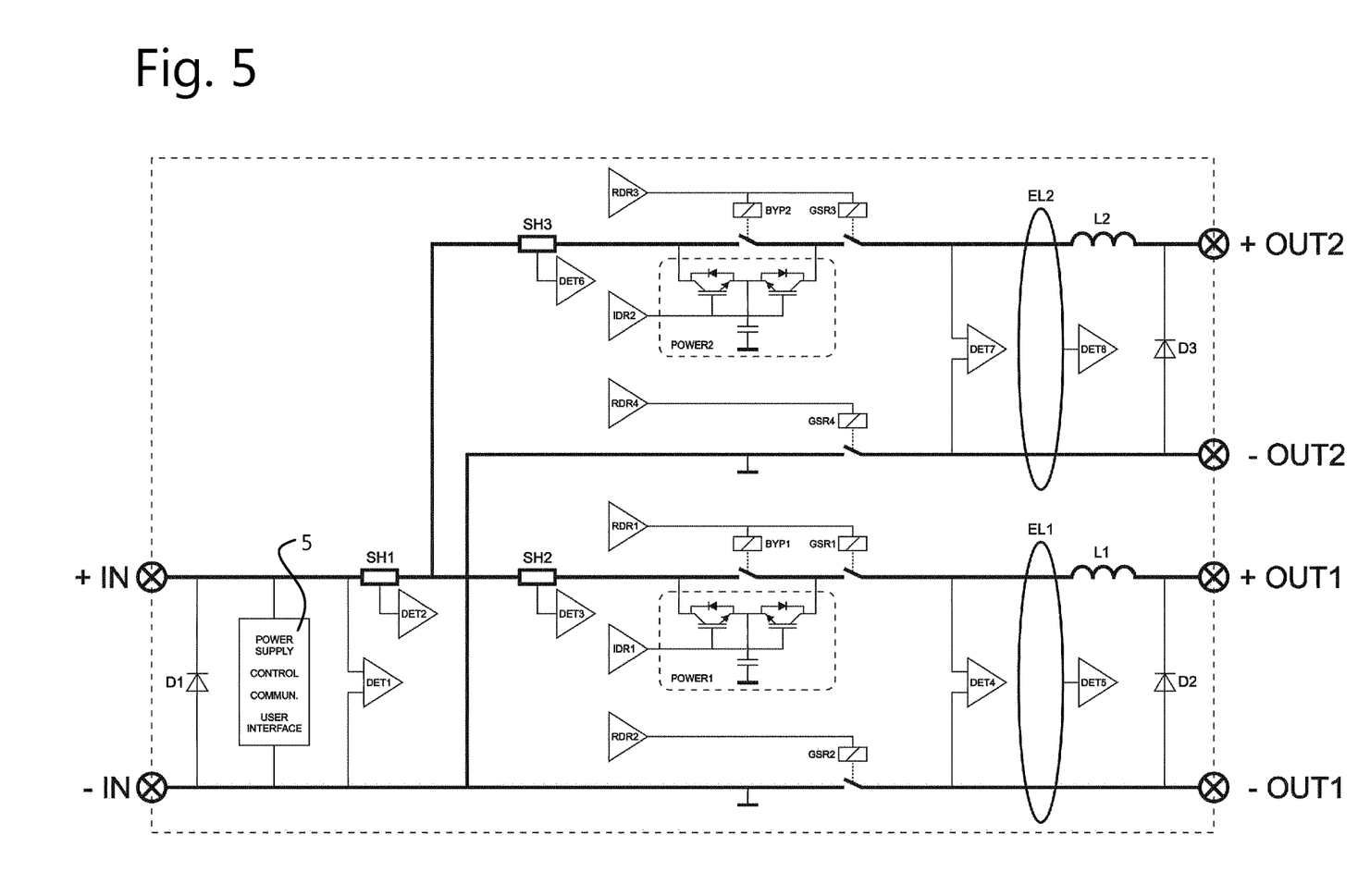
FIG. 5 shows a schematic diagram of a fifth embodiment of the hybrid DC circuit breaker according to the present invention.

An even further embodiment of the direct current circuit breaker according to the present invention is shown in the schematic diagram of FIG. 5. In this version there are two or more output terminals +OUT2, −OUT2 (the other being referenced now as +OUT1 and OUT1), connectable to the same input terminals +IN, −IN, processing unit 5 and input side shunt resistor SHI using similar components for the circuit breaker functions in both branches. This hierarchy can be used as a complete DC-distribution system with flexible remote configurable functionality. This version can also be used in case of availability of a 4-wire cable to the sub-distribution board (two wires for +OUT1, −OUT1 and two wires for +OUT2, −OUT2). Such 4-wire cables are very common used in the AC-world for three-phase and neutral wiring. In generic wording, the embodiment relates to a direct current circuit breaker, wherein a primary circuit is formed by the positive supply line and the negative supply line, further comprising at least one secondary circuit connected to a secondary positive output terminal +OUT2 and to a secondary negative output terminal −OUT2, the at least one secondary circuit being a duplicate of the primary circuit. Similar components are then provided in both the primary circuit and the at least one secondary circuit (the two branches in the embodiment of FIG. 5), and the primary circuit and the at least one secondary circuit may be implemented in accordance with any one of the embodiments described herein.

Figure 6A:
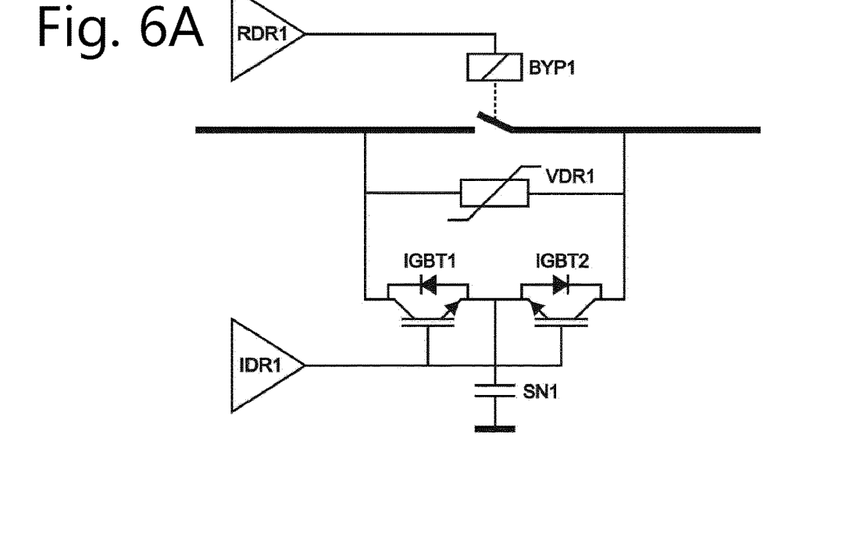
FIGS. 6a and 6b show two alternative arrangements of implementations of the semiconductor switch element as applied in the embodiments of the present invention.
Figure 6B:
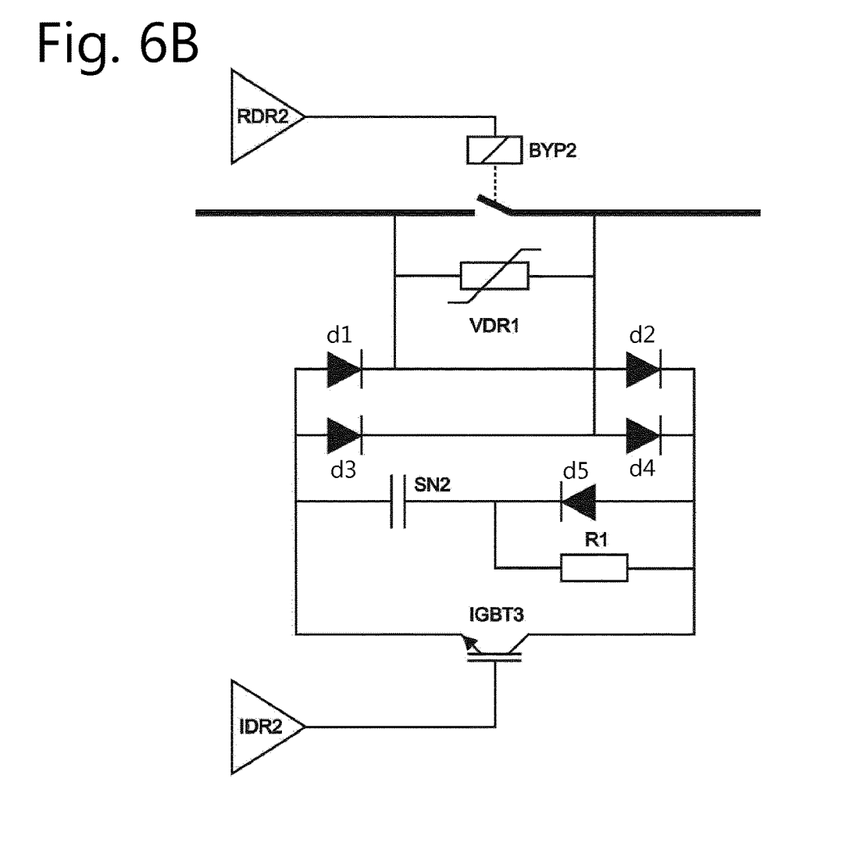

FIG. 6A and FIG. 6B shows schematic diagrams of possible implementations of the semiconductor switch element POWERn. In the FIG. 6A embodiment, the semiconductor switch element POWER1 comprises a back-to-back circuit arrangement of two isolated gate bipolar transistors IGBT1, IGBT2, connected as indicated, and controlled by the input drive signal IDR1 originating from the processing unit 5. As an alternative, shown in the FIG. 6B embodiment, the semiconductor switch element POWER1 comprises a bridge rectifier d1-d4 and an isolated gate bipolar transistor IGBT3, which is controlled using an input drive signal IDR2 originating from the processing unit. In both alternative embodiment, an overvoltage protection element VDR1 is connected in parallel to the bypass switch BYP1, resp. BYP2.

Furthermore, these embodiments of the semiconductor switch element POWERn may comprise appropriate snubber circuitry to suppress voltage transients caused by a sudden interruption of current. In the embodiment of FIG. 6A the snubber circuitry is provided as a separate snubber capacitor SN1 connected to the emitters of the isolated gate bipolar transistors IGBT1, IGBT2, and in the embodiment of FIG. 6B provided as snubber circuit comprising a capacitor SN2, diode d5 and resistor R1.

In further embodiments, some components are rearranged in the embodiments described above, with the added advantage of allowing easy and reliable disconnection of loads and setting the output terminals +OUTi, −OUTi free for maintenance of the installation. One of these embodiments is shown in the schematic diagram of FIG. 8.

For maintenance normally the output terminals +OUTi, −OUTi must be galvanic separated from the input+IN, −IN (as prescribed by the relevant standards for utility grids). In case of multiple output terminals +OUTi, −OUTi (see also the FIG. 5 embodiment) it could be advantageous to combine the galvanic separation for all outputs for cost reasons.

Figure 8:
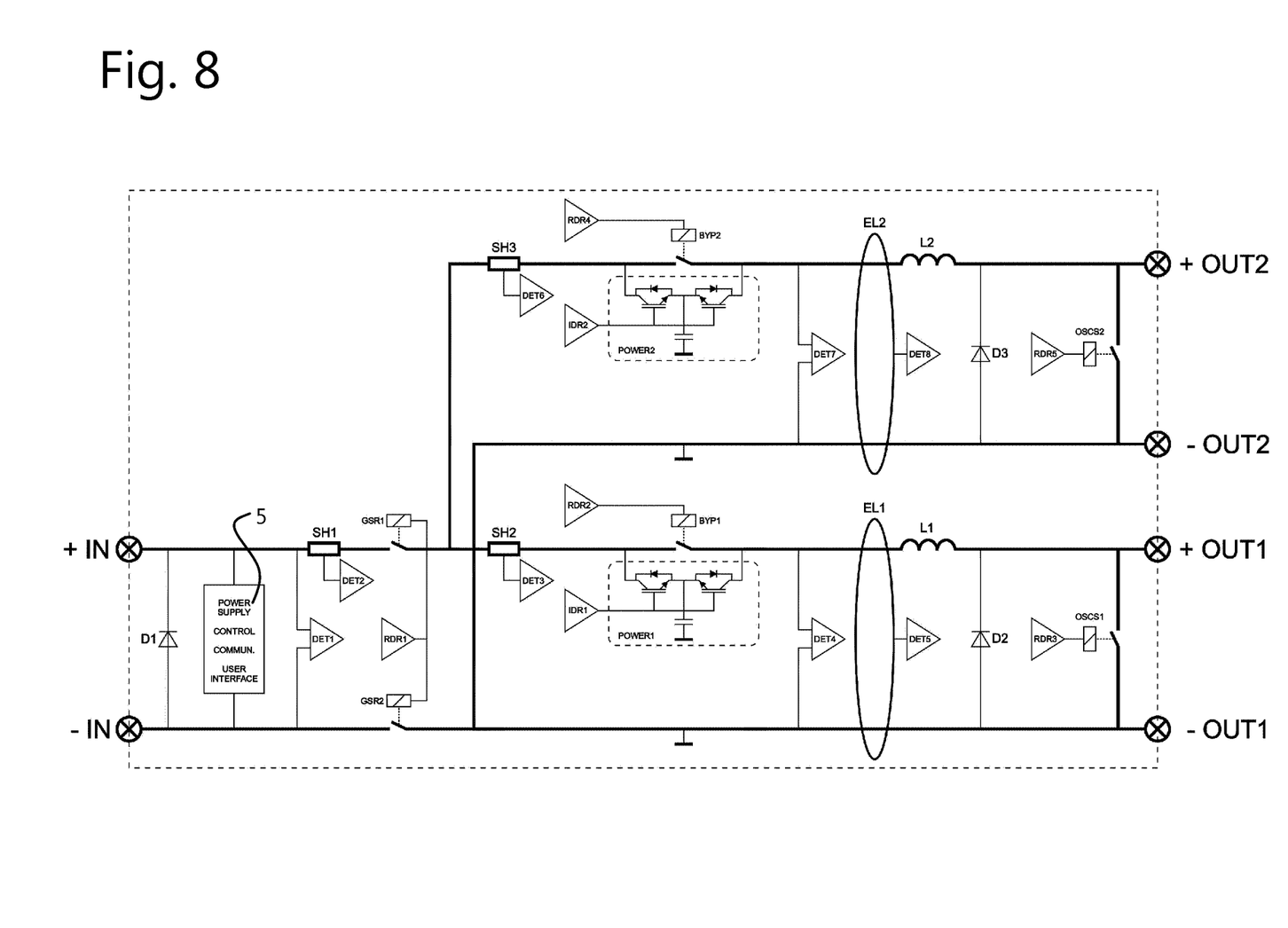
FIG. 8 shows a schematic diagram of a sixth embodiment of the hybrid DC circuit breaker according to the present invention.

In one embodiment this is accomplished by relocating the first galvanic separation switches GSRn and the second galvanic separation switch GSR2 from the parallel current paths +POLEn, −POLE, to a mutual part of the positive supply line and negative supply line, respectively. The input terminals +IN, −IN and processing unit 5 connected to the positive supply line and negative supply line form a mutual part of the direct current circuit breaker, and in this embodiment, the mutual part further comprises one or more common galvanic separation switches GSR1, GSR2. In the embodiment shown in FIG. 8, the processing unit 5, first current measurement arrangement (using shunt resistor SHI), first voltage measurement arrangement DET1, and (common) galvanic separation switches GSR1, GSR2 are directly connected in this mutual part. The common galvanic separation switches GSR1, GSR2 may be controlled by a single relay driver signal RDR1 as shown in FIG. 8.

The separate branches to the first and second output terminal pairs+OUT1, −OUT1, +OUT2, −OUT2 are then implemented using similar components. A normal ON/OFF switching of loads connected to the direct current circuit breaker is thus done in this embodiment using the hybrid switch part (bypass switch BYPn and semiconductor switch element POWERn) of each parallel current branch. If maintenance is needed or e.g. in case of protection for over currents or earth faults in one of the parallel current branches, the common galvanic separation relays GSR1, GSR2 can be opened (under control of processing unit 5) as an extra safety measure.

In an additional or alternative embodiment, which is particularly advantageous if multiple power sources are connected to the hybrid direct current circuit breaker, an output short circuit switch OSCSi is provided between each output terminal pair+OUTi, −OUTi. In such a case a galvanic separation could be not effective since also some of the output loads can be sources, e.g. in case of a connected solar inverter. The output short circuit switches (in the embodiments of FIG. 8 OSCS1 and OSCS2) can be implemented using traditional relays, under control of a further relay driver signal (RDR3 and RDR5, respectively in the embodiment of FIG. 8) originating from the processing unit 5. Alternatively, the output short circuit switches OSCSi, can be implemented using silicon (semiconductor) switches.

It is noted that the embodiments described with reference to FIG. 8 (displacing the galvanic separation switches GSRn to a mutual part of the direct current circuit breaker, and/or adding the output short circuit switches OSCSi) can also be applied as additional feature in each of the embodiments described above with reference to FIG. 1-4. The commercial application of the present invention embodiment of the direct current circuit breaker is in the rapid increasing field of smart DC-grids for all kinds of use. Although the proposed embodiments are in general more expensive than a passive (i.e. traditional prior art) mechanical solution using mechanical separation switches only, a number of technical and communication advantages are provided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A direct current circuit breaker, comprising:
   a positive supply line between a positive input terminal and a positive output terminal;
   a negative supply line between a negative input terminal and a negative output terminal configured to connect a direct current load to a supply;
   a series connection of a first galvanic separation switch and a bypass switch in the positive supply line, and a second galvanic separation switch in the negative supply line;
   a semiconductor switch element connected parallel to the bypass switch, the bypass switch being configured to controllably electrically bypass the semiconductor switch element;
   a series connected inductor in the positive supply line; and
   a processing unit configured to control the first galvanic separation switch, the second galvanic separation switch, the bypass switch, and the semiconductor switch element.

2. The direct current circuit breaker according to claim 1, further comprising a second bypass switch in a series connection with the second galvanic separation switch.

3. The direct current circuit breaker according to claim 1, further comprising a first diode having a cathode connected to the positive input terminal and an anode connected to the negative input terminal.

4. The direct current circuit breaker according to claim 3, further comprising a second diode having a cathode connected to the positive output terminal and an anode connected to the negative output terminal.

5. The direct current circuit breaker according to claim 1, wherein a primary circuit is formed by the positive supply line and the negative supply line,
   the direct current circuit breaker further comprising at least one secondary circuit connected to a secondary positive output terminal and to a secondary negative output terminal, the at least one secondary circuit being a duplicate of the primary circuit.

6. The direct current circuit breaker according to claim 1, further comprising at least one additional bypass switch connected in parallel to the bypass switch, the at least one additional bypass switch and the bypass switch each being a mechanical switch.

7. The direct current circuit breaker according to claim 6, further comprising an additional semiconductor switch element connected in parallel to each of the at least one additional bypass switch.

8. The direct current circuit breaker according to claim 6, further comprising an additional galvanic separation switch connected in series to each of the at least one additional bypass switch.

9. The direct current circuit breaker according to claim 6, wherein the first galvanic separation switch and second galvanic separation switch are combined and operated using a single relay driver.

10. The direct current circuit breaker according to claim 9, wherein the combined galvanic separation switch comprises a constantly energized mono-stable relay.

11. The direct current circuit breaker according to claim 1, wherein the input terminals and processing unit connected to the positive supply line and negative supply line form a mutual part of the direct current circuit breaker, the mutual part further comprising one or more common galvanic separation switches.

12. The direct current circuit breaker according to claim 1, further comprising an output short circuit switch connected between the positive output terminal and the negative output terminal.

13. The direct current circuit breaker according to claim 1, further comprising a bypass current measurement arrangement for each of an associated bypass switch.

14. The direct current circuit breaker according to claim 13, wherein all bypass switches have an opening time which is shorter than an opening time of any one of the galvanic separation switches.

15. The direct current circuit breaker according to claim 1, further comprising a first current measurement arrangement connected to the processing unit and configured to measure current flowing from the positive input terminal to the positive supply line.

16. The direct current circuit breaker according to claim 1, further comprising a first voltage measurement arrangement connected to the processing unit and configured to measure a voltage between the positive input terminal and the negative input terminal.

17. The direct current circuit breaker according to claim 1, further comprising an earth leakage measurement arrangement connected to the processing unit and configured to monitor the positive supply line and negative supply line.

18. The direct current circuit breaker according to claim 16, further comprising a second voltage measurement arrangement configured to measure a voltage between the positive output terminal and the negative output terminal.

19. The direct current circuit breaker according to claim 1, wherein the processing unit is configured to output an ON switching through the semiconductor switch element to close the bypass switch after the second galvanic separation switch and then the first galvanic separation switch close based on an ON command.

20. The direct current circuit breaker according to claim 19, wherein the second and first galvanic separation switches close at the same time, or the first galvanic separation switch closes consecutively after the second galvanic separation switch.

* * * * *